July 2, 1929.                J. R. REPLOGLE                1,719,024
                               REFRIGERATOR
                          Filed Feb. 28, 1921        9 Sheets-Sheet 4
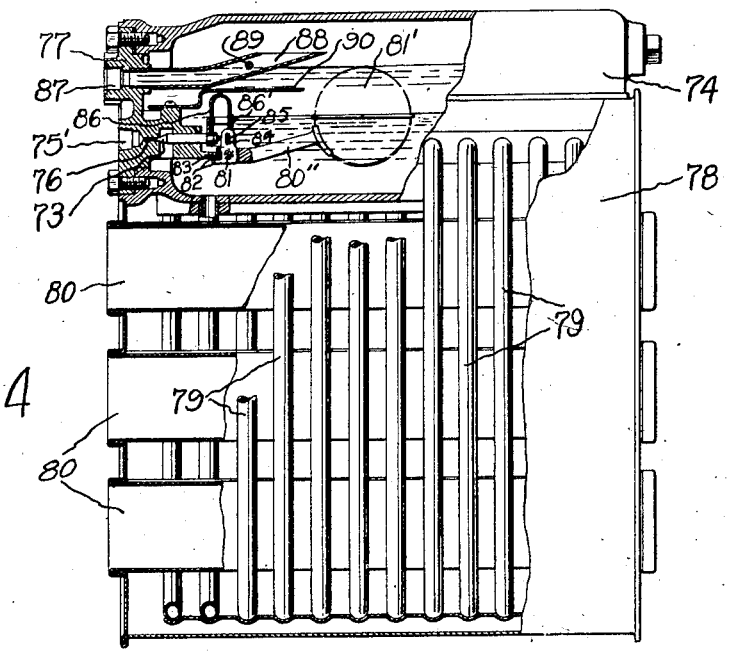
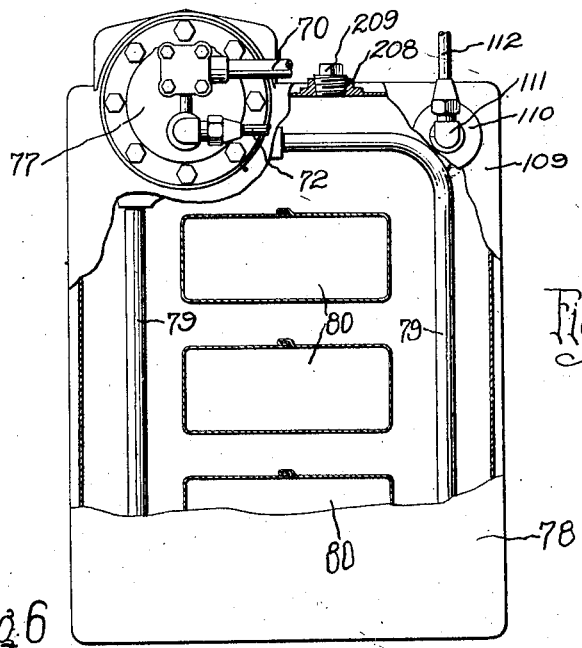
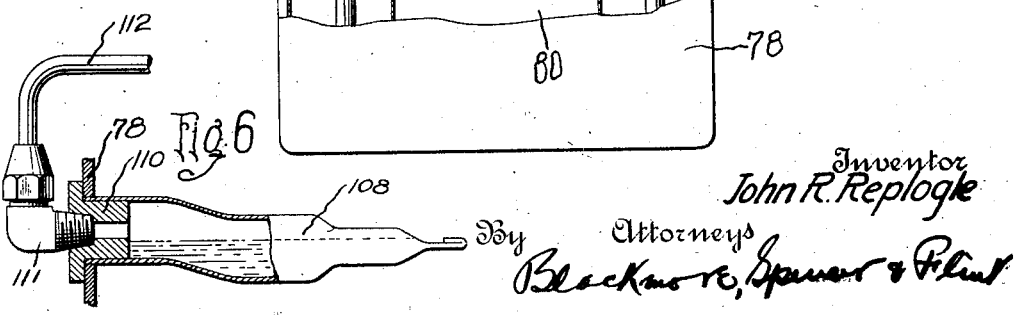

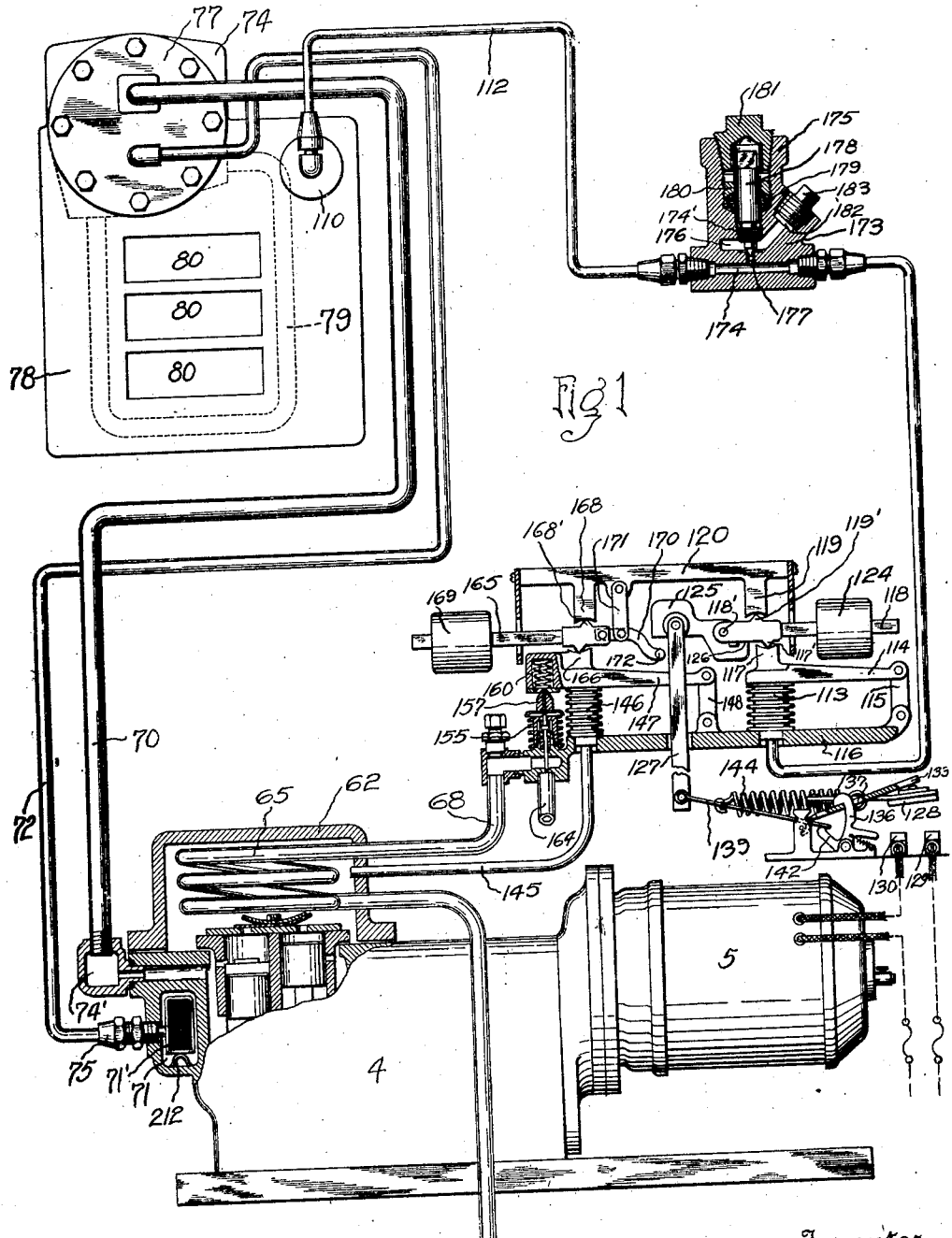

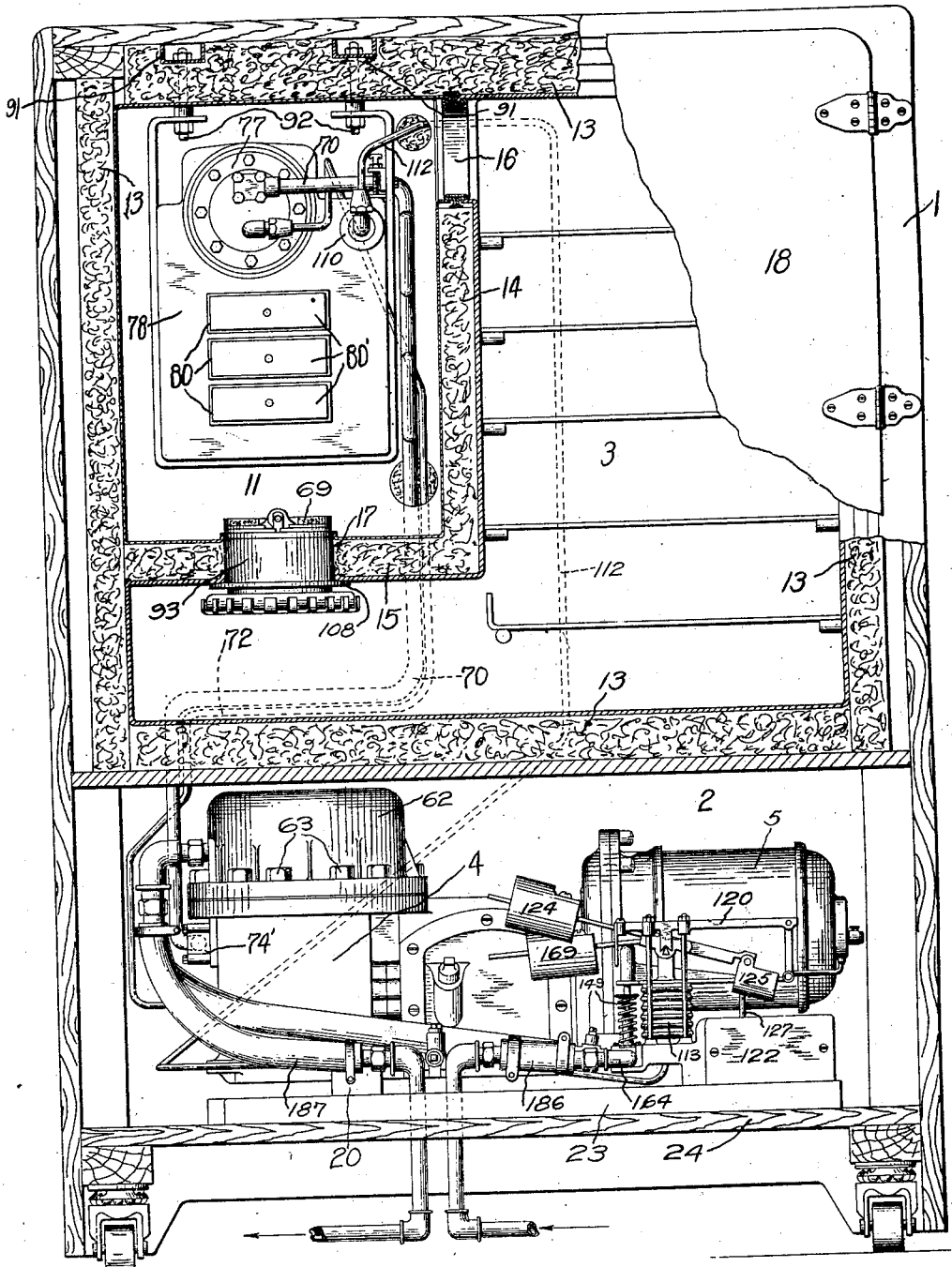

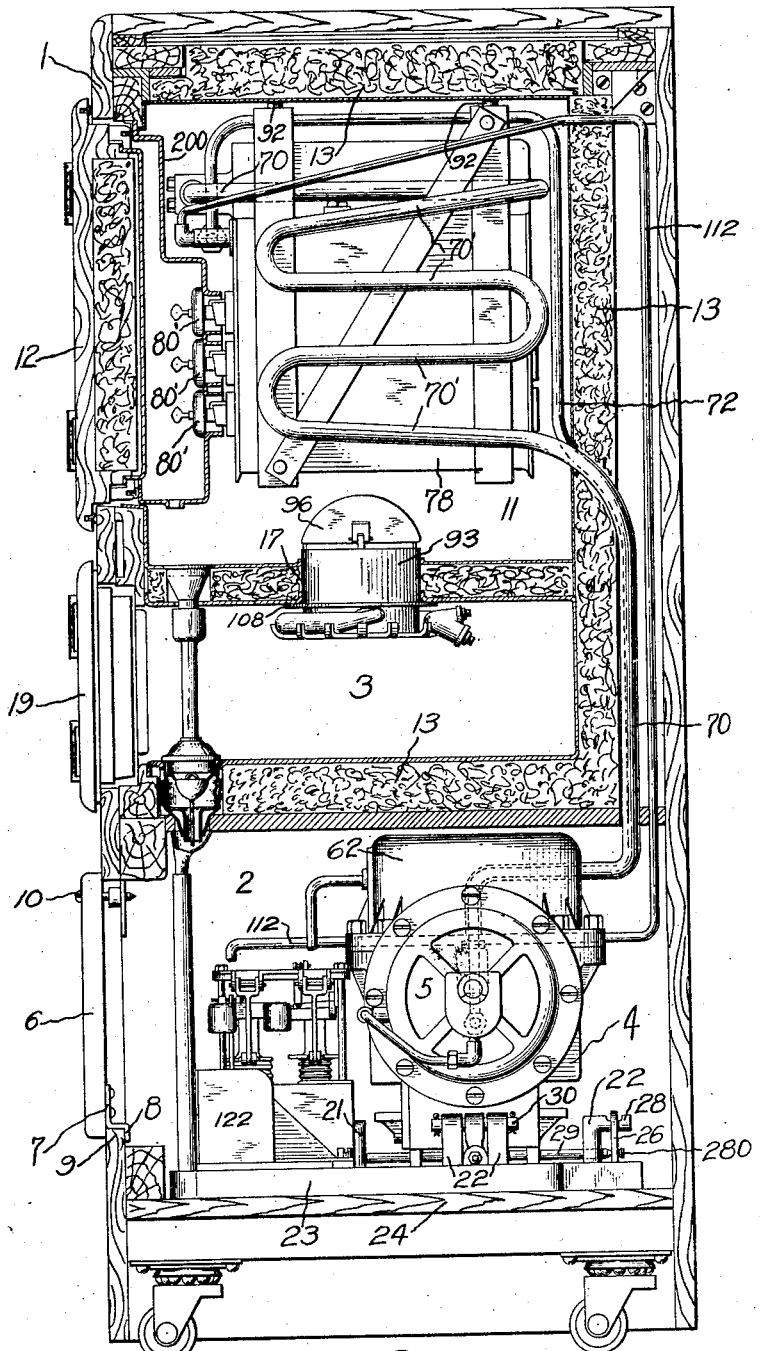

July 2, 1929.  J. R. REPLOGLE  1,719,024

REFRIGERATOR

Filed Feb. 28, 1921   9 Sheets-Sheet 5

Inventor
John R. Replogle
By Attorneys
Blackmore, Spencer & Flint

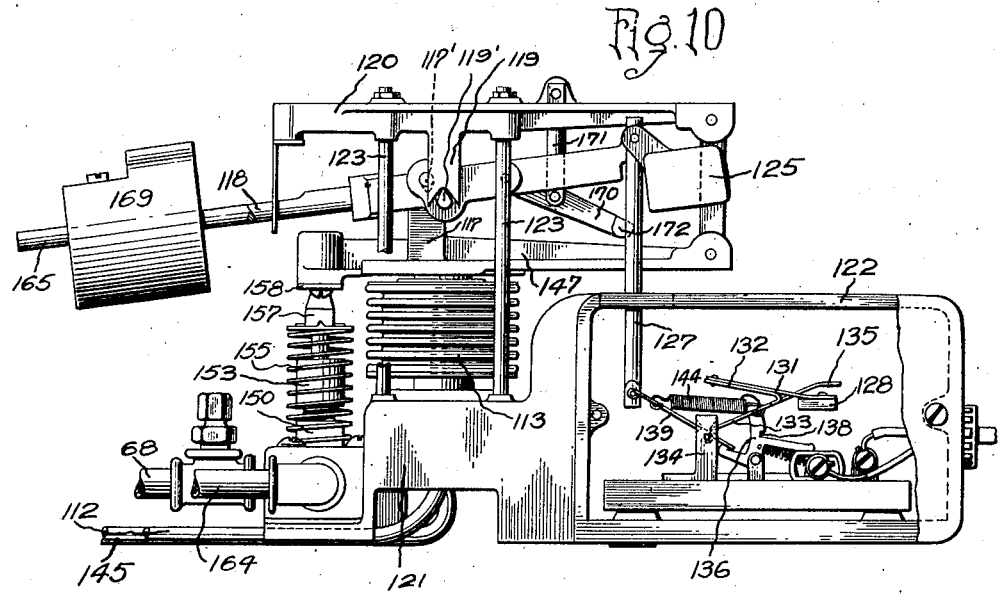
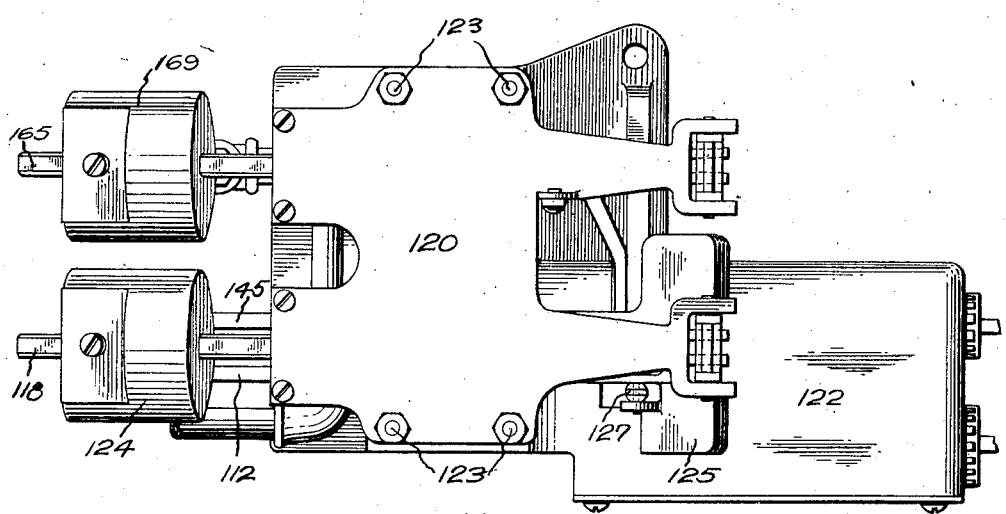

July 2, 1929.  J. R. REPLOGLE  1,719,024
REFRIGERATOR
Filed Feb. 28, 1921   9 Sheets-Sheet 7
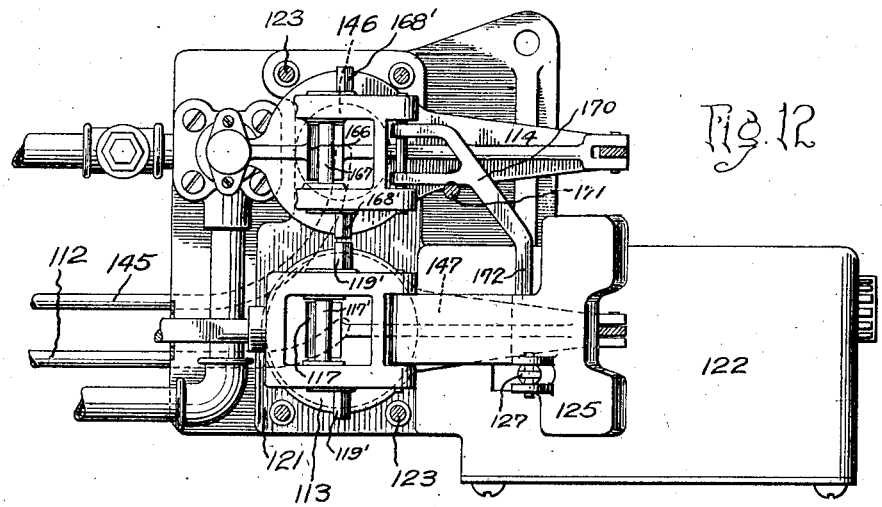
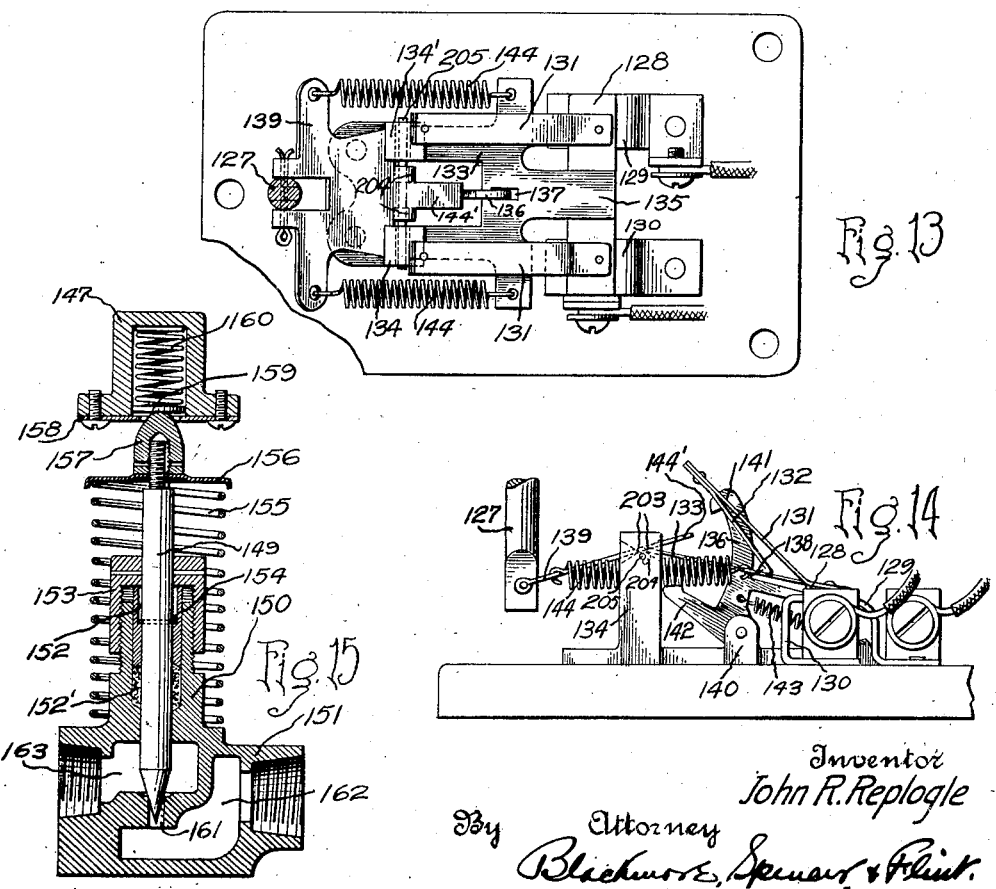
Inventor
John R. Replogle
By Blackmore, Spencer & Flint
Attorney July 2, 1929.  J. R. REPLOGLE  1,719,024
REFRIGERATOR
Filed Feb. 28, 1921  9 Sheets-Sheet 8

Inventor
John R. Replogle
By Attorney
Blackmore, Spencer & Flint

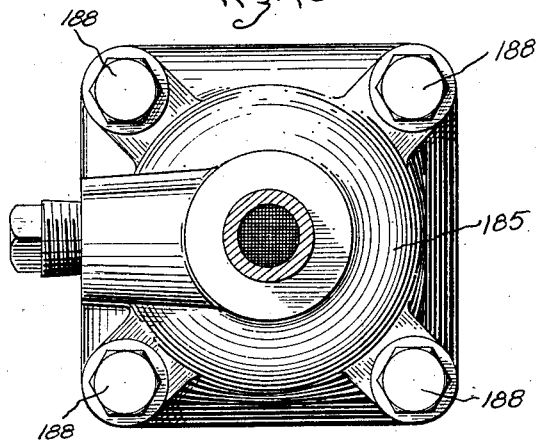
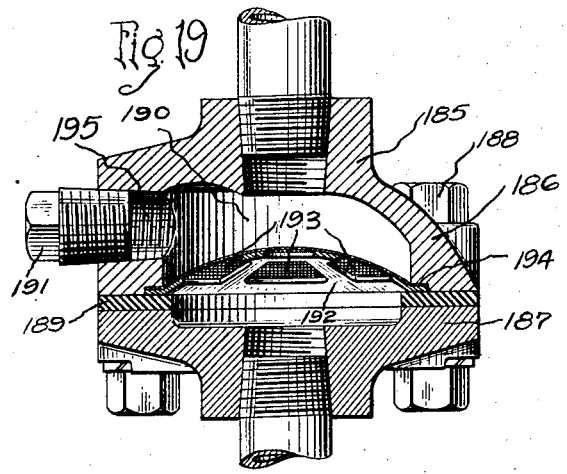

Patented July 2, 1929.

1,719,024

UNITED STATES PATENT OFFICE.

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

REFRIGERATOR.

Application filed February 28, 1921. Serial No. 448,331.

This invention relates to refrigerating devices and more especially to refrigerating devices of the compression type.

One of the objects of the invention is to provide a refrigerating device that, while it is adapted to be employed for making ice for commercial purposes and to be employed in refrigerators of large capacity, is especially adapted for refrigerators of smaller capacity usually employed for household or domestic purposes.

Another object of the invention is the construction of a refrigerating device in which the operation of the compressor or compressors is automatically controlled by the varying conditions of temperature and pressure and one in which it is only necessary for the motor to run at infrequent intervals.

Another object of the invention is the provision of means wherein the lubricant for the compressor mechanism remains in circulation with the refrigerant during its entire cycle, whereby the moving parts of the compressor proper are properly lubricated and the pistons provided with efficient oil seals.

Another object of my invention is the provision of means for conducting the refrigerant and oil in liquid state to a receptacle in the refrigerating compartment through a port having an automatically controlled valve and the provision of means whereby no liquid refrigerant is returned to the compressor in order that the refrigerator may operate at its greatest efficiency.

Still another object of my invention is the provision of means for automatically regulating the circulation of air through the cooling or refrigerating chamber.

With the above and other objects in view my invention consists in the novel features of construction, and arrangement of parts to be hereinafter more fully described, claimed and illustrated in the accompanying drawings, in which—

Fig. 1 is a diagrammatic view of the refrigerating mechanism, parts being in section to show their internal structure;

Fig. 2 is a front elevation, parts in section and parts broken away of a refrigerator assembly, looking toward the back;

Fig. 3 is a vertical section taken at right angles to that shown in Fig. 2;

Fig. 4 is a side elevation of the refrigerating or brine tank, and the header or expansion chamber, parts broken away;

Fig. 5 is a front elevation of the same, parts broken away;

Fig. 6 is a side elevation of the thermostatic bulb and associated elements, with parts broken away;

Fig. 10 is a side elevation of the switch and controller, parts broken away;

Fig. 11 is a top plan view of the same;

Fig. 12 is a plan view of the controller for the switch, parts shown in section;

Fig. 13 is a plan view of the switch;

Fig. 14 is a side elevation of the same;

Fig. 15 is a vertical section of the pressure controlled water valve;

Fig. 18 is a bottom plan view of the water strainer; and

Fig. 19 is a vertical section thereof.

Figure 7:
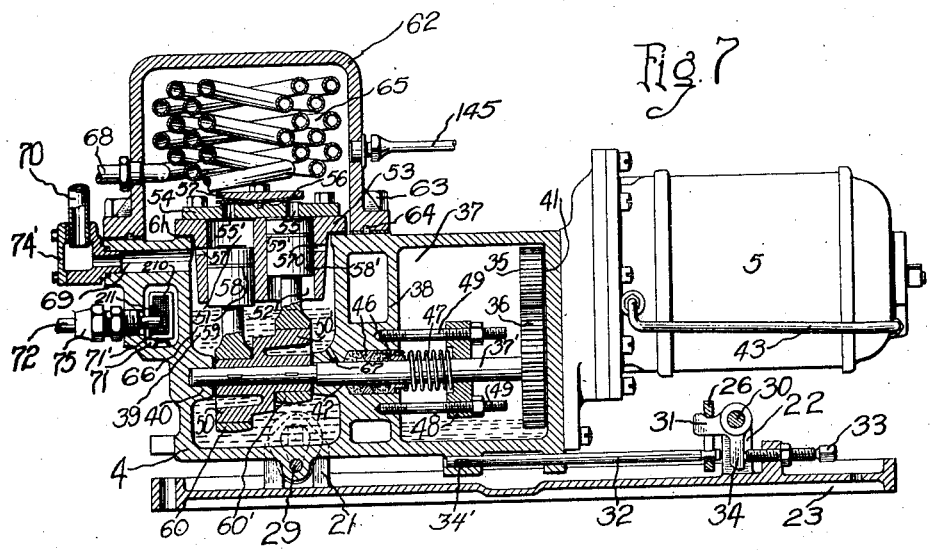
Fig. 7 is a vertical section of the compressor with the motor in elevation.

Referring now to the drawings, the reference numeral 1 designates a refrigerator suitable for domestic or other uses, having the machine compartment 2 which may be located at any convenient point as in the lower portion of the refrigerator, and the refrigerated or cooled compartment 3. Located within the lower or machine compartment are the compressor 4, the motor 5 and the attendant pipes, valves and various controls. This compartment has a door opening closed by the door 6. This door may be mounted in any convenient manner. It is necessary however in order that the noise of the operating machinery be reduced to a minimum and to prevent rattling of the door when the machinery is in operation, that the door fit tightly. As shown, it is made larger than the opening and has metallic straps 7 (see Fig. 3) secured to its lower edge. These straps are off-set at 8 to permit them to engage over the edge 9 of the frame of the opening. The upper edge of the door is secured in position by means of screws 10. This form of mounting makes a very cheap means for securing the door in position and one that is efficient for the purposes intended. The upper compartment 3 has its top, bottom and side walls provided with heat insulating material 13.

Located within or adjacent to the compartment 3 as for example at one side and within the upper portion of this compartment is a relatively small refrigerating or cooling chamber 11 open at its front end and closed by the door 12. (See Figs. 2 and 3). The walls of the compartment 3 may form two sides and the top of this chamber. The remaining side 14 and the bottom 15 of this chamber may be also provided with heat insulating material, although this is not necessary. Two openings are provided one above the other for the circulation of air through the chamber. As shown, the wall 14 is provided at its upper edge with an opening 16 and the bottom with an opening 17 for the circulation of air through this chamber 11.

The food compartment may be considered as a continuous L-shaped compartment, one part extending vertically along the side of the chamber 11 and the other laterally beneath the said chamber. The arrangement of the compartment is not material. It is lined with porcelain or enameled material, as is common in such structures.

This compartment is closed by any convenient arrangement of doors. As shown, this is accomplished by means of the full length main door 18 and the smaller door 19 located beneath the door 12.

Arranged within the lower compartment 2 is the compressor unit which consists of the compressor proper 4, the motor 5 and attendant mechanism. The motor and compressor are preferably connected together to form a single unit which may be, and preferably is, swingingly mounted on a three point suspension, in order to deaden the noise and vibration incident to the operation of the machinery. It is understood however that the motor and compressor may be mounted separately but they are preferably connected together as a single unit and swingingly mounted as described below.

Figure 8:
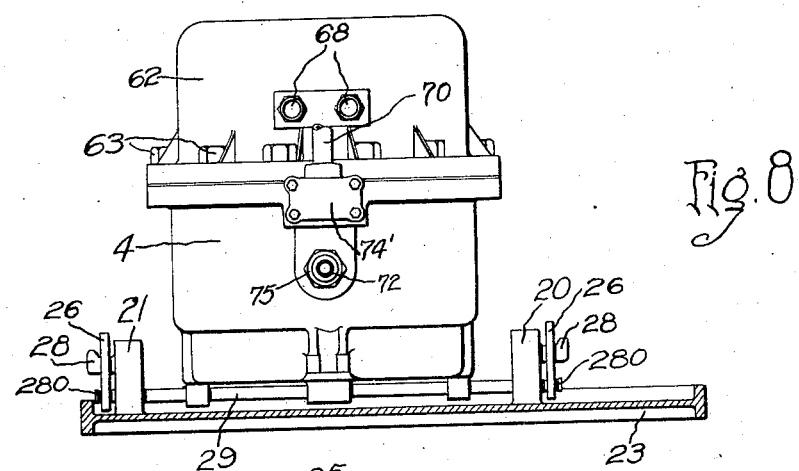
Fig. 8 is a side elevation of the compressor.
Figure 9:
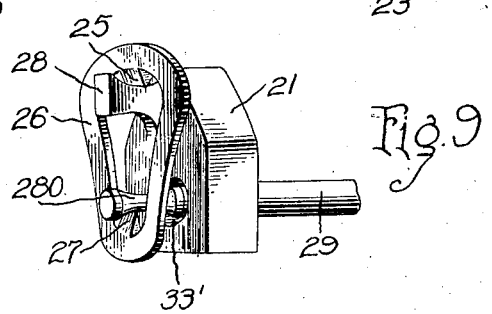
Fig. 9 is a perspective of one of the hangers for the motor-compressor unit.
Figure 16:
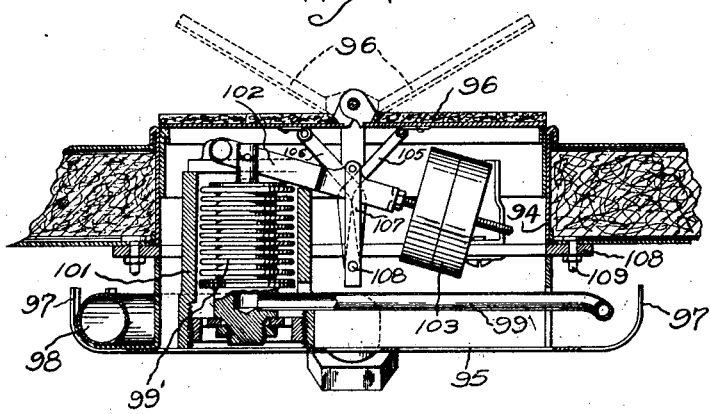
Fig. 16 is a vertical section of the food compartment temperature controlling device.
Figure 17:
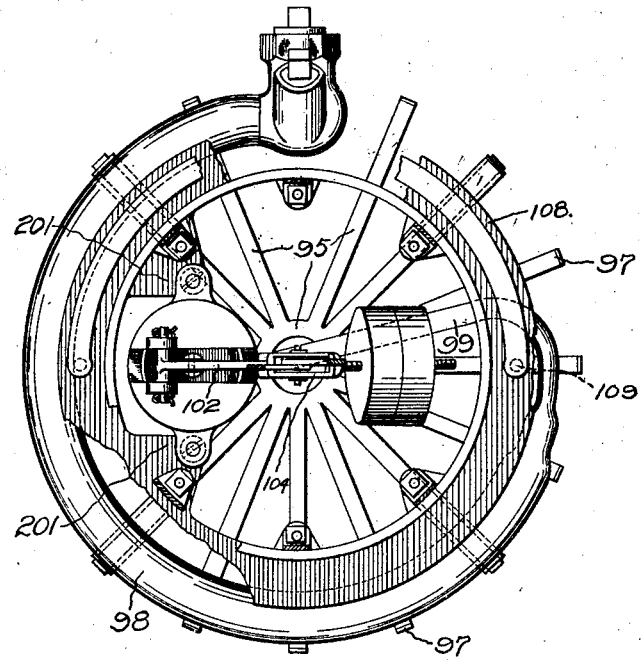
Fig. 17 is a top plan view of the same, parts broken away and showing the supporting wall in section.

The suspension includes the front and rear supporting posts 20 and 21 (see Figs. 7 and 8) and the side post 22 rigidly attached to the base or supporting platform 23 which rests on the bottom wall 24 of the lower compartment and is secured thereto. The posts 20 and 21 are each provided with a laterally extending bearing arm 28 which is engaged by the downwardly extending knife edge bearing 25 on the suspending link 26 (see Fig. 9). The lower end of each of the links 26 is provided with an upwardly extending pointed or knife edge bearing 27 that engages a bearing member 280, carried by a support on the compressor. As shown, this support is a resilient rod 29 located in an enlarged opening 33' in the post 21 and extends beneath and is secured to the compressor proper. The third supporting member has two spaced posts 22, (see Figs. 3 and 7) connected at their upper ends by the journal rod 30. Mounted on the rod 30 is a bell crank having a horizontal supporting arm 31 which is engaged by the supporting link 26, which, in turn engages a rod 32 connected to the motor end of the unit for supporting the same. A set screw as at 34' permits a slight longitudinal movement of the rod. A set screw 33 engages the downwardly extending arm 34 of the bell-crank for raising or lowering the motor end of the unit to thereby compensate for irregularities in floors on which the refrigerator may be placed. This adjustment is desirable in order to maintain the bearings at each end of the motor shaft in substantially the same horizontal plane, whereby the proper distribution of the lubricant for the motor is effected.

A pinion 35 on the motor shaft 41 drives a gear 36 located in a closed oil chamber 37, which contains oil for lubricating these gears. The gear 36 is mounted on the pump or eccentric shaft 37' which extends through the bearing 42 in the partition 38 and through the chamber 39 and into a bearing 40 in the end wall of the compressor 4.

The lubrication of the motor is accomplished by the gears 35 and 36 carrying the oil from the bottom of the oil chamber to the journal for the motor shaft 41. A small oil reservoir at each end of the motor supplies the motor shaft with oil at those points. A tube 43 connecting these reservoirs equalizes the oil supply. This structure is old in the art and needs no further detail description.

The journal or bearing 42 has a counterbore with a concaved bottom (see Fig. 7) which forms a stuffing box in which are placed layers of suitable packing material with intermediate and end glands 46 for compressing the same. A spring 47 is held in engagement with a boss on the outer gland by means of a plate 48 adjustably held against the spring by means of nuts screw-threaded on the ends of bolts 49 that pass through the plate and are secured in the partition 38. By this adjustable arrangement of the packing the journal 42 is made proof against leakage of gas and oil therethrough.

The chamber 39 is closed at its upper end by means of the cylinders 51 and 52 which are provided with the flange 53 secured to the upper edge of the said chamber. The upper end of the cylinders are closed by the cylinder head 54 provided with outlet ports 55 and 55'. These ports are closed by means of a thin flexible resilient plate or flapper valve 56 held in position by means of a rigid plate 57 slightly convex on its under side to provide a clearance for the operation of the outer ends of this flapper valve. The cylinders 51 and 52 have inlet ports 57' and 570, respectively, which are alternately uncovered by the pistons 58 and 58', when they are at the limit of their downward movement. These pistons are provided with oil grooves 59 and 59'. The pistons are so constructed that they make a close fit within the cylinders so that oil may constitute the sole sealing means between each piston and its cylinder. This is considered a very important feature of the device.

The pistons 58 and 58' are operated by means of connecting rods 60 and 60' connected to eccentrics 50 and 50' fixed at 180° apart on the eccentric or pump shaft 37'. These eccentrics do not have a very great throw, and the clearance between the ends of the piston and the cylinder head is so arranged that it is very slight. The proper amount of clearance may be obtained by varying the number of gasket papers 61 employed beneath the cylinder flange 53.

A dome 62 (see Figs. 7 and 8) is secured by means of bolts 63, to the compression chamber, over the cylinder head. A gasket 64 in a groove in the dome is interposed between the meeting edges of the dome and chamber in order to make this joint non-leakable. A water pipe 68 forms a condenser coil 65 within the dome. Water flowing through this coil from any suitable source of supply condenses the compressed refrigerating vapor as will presently appear.

A suitable lubricant 66 is placed within the chamber 39 to a level slightly below the lowest position of the bottom of the pistons. In operation, the oil is splashed on the various journals and within the cylinders and is continually scrubbed past the pistons, and is forced along with the compressed vapor through the ports 55 and 55' into the dome where it is absorbed by or dissolved in the $SO_2$ liquid. Some of the lubricant finds its way through the oil duct 67 for lubricating the adjacent bearing. It will thus be seen that the entire mechanism is lubricated automatically.

Any suitable refrigerating medium or refrigerant may be employed such as sulphur dioxide. The vapor is drawn by the pumps from the refrigerating unit through the return pipe 70 (see Figs. 1 and 7) connecting joint 74', inlet passage 69 and ports 57' and 570 into the cylinders, and there compressed and forced into the dome 62 where it is condensed by the water coil, and from there forced in liquid form through the outlet passage 71 through the strainer 71', the connecting joint 75, the outlet pipe 72 and through the inlet passage 75', (see Fig. 4) containing the restricted passage 76, past the float-operated needle valve 73 and into the header or expansion chamber 74.

The strainer 71' prevents foreign bodies from entering the pipe 72 and consists of a removable rectangular member having its sides closed by the reticulated members 210, 211 to form a chamber into which one end of the pipe 72 extends. Suitable springs 212 secure the strainer on the end of the pipe 72.

The evaporator, vaporizer or refrigerating unit consists of the header or expansion chamber 74 which may be of any suitable shape or form, and for the purpose of greater efficiency may be provided with the coils or pipes 79. If desired, a refrigerating or brine tank containing a heat transferring liquid having a comparatively low freezing point may be associated with the pipes and expansion chamber, as shown on the drawing, although the brine tank is not necessary to the operation of the device.

The header or expansion chamber 74 is secured in or adjacent to, the refrigerating or brine tank 78 as for example it is shown as being located in the upper left-hand corner thereof. This header is preferably metallic as of cast bronze, although any other suitable material may be employed. Pipes 79 connected to the bottom of the header descend to a point near the bottom of the brine tank and extend laterally and upwardly about the ice drawer chambers 80 containing the ice drawers 80' in the brine tank and are connected to the side of the expansion chamber or header 74 as clearly shown in Fig. 5. This arrangement insures a proper circulation of the refrigerant within the pipes.

The header is closed at its front end by means of the end plate 77 and is adapted to contain liquid refrigerant and oil. The oil which is pumped into the boiler in solution in the $SO_2$ liquid is left behind in the distillation of that liquid and being lighter than the latter floats on the same.

The expansion valve is placed at the entrance to the header. This is an important feature since by thus locating this valve none of the refrigerant is permitted to vaporize in the pipes leading from the condenser to the header.

The end plate 77 (see Figs. 4 and 5) carries the needle valve 73 and may also have pivotally secured to an extension thereof as at 81 a float stem 80" to which is rigidly attached the float 81' so arranged or calibrated that it floats in the liquids in such a manner that should the liquid refrigerant rise above a predetermined height, the needle valve will be closed by the action of the float. The float stem 80" has shoulders 82 that are adapted to engage the finger 83 on the end plate 77 to limit the upward and downward movements of the float. A slotted projection 84 on the float stem 80" engages a pin 85 on one end of an inverted U-shaped spring 86 the other end of which is secured to the rear of the expansion or needle valve 73. A stirrup or keeper 86' secured with the spring to the valve and extending about the float end of the spring permits a spring action in seating the valve but affords a positive action in withdrawing it. By interposing the spring between the projection on the float valve stem and the needle valve, all danger of jamming the needle valve into seat in the restricted passage 76 with the attendant injury to, and sticking of, the valve is eliminated. This is a very important feature since in transportation, if it were not for this spring, the valve would likely become jammed in its seat by the movement of the float stem, due to the action of the vibrating liquid on the float. The end plate 77 also has an outlet passage 87 located above the inlet passage and at about the level of the oil in the boiler. A tube 88 is attached to the inner end of this passage and has its free end extending inwardly and upwardly above the oil level. Openings 89 in the free end of this tube at the oil level permit the oil to flow into the pipe 70 when the oil level rises above a predetermined height.

The oil that overflows will contain some liquid $SO_2$ in solution and in order to make use of this, the return pipe 70 through which the $SO_2$ vapor and oil are drawn by the compressors is arranged in loops or sinuations with the sections 70' slightly inclined and arranged between the walls of the refrigerating chamber and the brine tank as shown in Figs. 2 and 3. The oil as it moves slowly along under the influence of gravity has the $SO_2$ evaporated out of it by the decrease in pressure and the absorption of heat from the air in the refrigerating compartment. This is an important feature, since the $SO_2$ held in solution in the oil is utilized as a refrigerant during its return to the compressor.

The intermediate portions of the pipes 70 and 72, may, if desired, be imbedded in the insulating material of the back wall in juxtaposition to each other whereby the liquid refrigerant within the pipe 72 will be somewhat further cooled by giving up a portion of its heat to vaporize the refrigerant particles remaining in solution in the oil in the pipe 70.

The liquid refrigerant is forced under pressure through the restricted passage 76 into the header where the pressure is greatly reduced thus permitting the liquid $SO_2$ to boil or vaporize and in so doing to lower the temperature of the brine as well as the liquid $SO_2$ itself. The colder portions of the $SO_2$ liquid sink to the bottom of the boiler by passing into the tubes, (at the bottom thereof) where heat in the brine is absorbed by this liquid causing it to expand and portions to vaporize and flow into the header at the side thereof thus keeping up a constant circulation through the tubes with the resultant lowering of the temperature of the brine.

A baffle plate 90 is located between the surface of the $SO_2$ liquid and the outlet tube 88 to prevent liquid $SO_2$ from being thrown into this tube by the ebullition of the refrigerant.

The tank 78 herein referred to as the refrigerating or brine tank is supported in any convenient manner, as for instance, by being suspended from U-shaped channel bars 91 embedded in the insulating material in the top of the refrigerator and properly supported from the frame-work below the top wall and exterior of the lining. As shown, this is accomplished by means of U-shaped metal bars or straps encircling the tank and having their upper ends bent inwardly and secured to bolts 92 carried by the said channel bars in such a manner that the brine tank may be properly laterally adjusted, as by means of slots in the bars or supports in order to bring the openings 80 in the brine tank to register with the corresponding openings in member 200 (see Fig. 3) which constitutes the finished front of the refrigerating chamber. Any suitable fluid having a comparatively low freezing point may be employed as a heat conducting medium such for instance as calcium chloride ($CaCl_2$), which after being poured into the tank through the opening 208 is sealed therein by the plug 209 which prevents loss of the fluid due to splashing or evaporation. The tank is provided with receptacles or openings 80 accessible from the front in which are adapted to be placed drawers 80' containing water or edibles to be chilled or frozen.

The temperature in the food compartment is regulated by the damper 93 secured by means of the plate 108 and bolts 109 in the ventilating opening 17. This damper consists of a casing 94 with a spider 95 at its lower extremity and cover plates 96 hinged to a common pivot at its upper extremity for closing the opening through the casing. The spider has projections 97 extending outwardly and upwardly on which rests the bulb 98 containing an expansible fluid that vaporizes at comparatively low temperature such as sulphur dioxide ($SO_2$). The bulb extends about the casing and terminates in a reduced tube 99 which is secured in the lower end of a corrugated longitudinally expansible member or bellows 99'. The bellows is located within a drum 101 secured by ears 201 to the plate 108, and has a pin and slot connection at its upper end with a lever 102 secured to the upper end of the said drum 101. The free end of the lever 102 has adjustably mounted thereon a weight 103. Extending through a loop 104 in the lever 102 are the links 105 and 106 pivoted to the cover plates 96. A U-shaped member 107 pivoted to the lever 102 at its upper end is pivoted to the links 105 and 106 at a common pivot 108 at its lower end.

The weight is so adjusted that the food compartment may be kept at a predetermined temperature. When the temperature rises in the food compartment it causes the expansion of the $SO_2$ vapor in the bulb and the pressure causes the bellows to expand thus raising the lever and opening the covers 96. The reverse operation takes place when the temperature in the food compartment falls below the predetermined temperature.

The motor and compressor are not required to run continuously and means are provided for automatically starting and stopping the motor. In the form shown an electrical motor is employed and the motor is started and stopped by automatically opening and closing a switch mechanism which is controlled by a thermostat located within the refrigerating or brine tank. The controller or thermostat 108 (see Figs. 1, 5 and 6) consists of a bulb partly filled with a fluid that expands at comparatively low temperatures, as methyl chloride ($CH_3Cl$), the arrangement being such that there will always be some of the liquid that is not vaporized, in order to insure the vapor being always saturated. The thermostat is secured to the front wall 109 of the refrigerating or brine tank 78 by the apertured thimble 110. A coupling 111 is secured in the aperture of the thimble and has a pipe 112 extending vertically and then laterally and downwardly to the bottom of the bellows 113 mounted on a projection 121 of the switch box 122 located within the lower compartment. An arm 114 is secured to the upper end of the bellows and has its free end bifurcated. A link 115 has one end pivoted to a member carried by the base 116, the other end of the link being pivoted between the bifurcations at the end of the arm 114. A projection 117 on the arm 114 extends directly above the bellows 113 and forms a bearing for a knife edge 117' carried by the lever 118. The upper side of the lever 118 has a knife edge 119' that engages a fulcrum member 119 secured to the top frame 120 which in turn is supported by posts 123 mounted on the projection 121. A weight 124 is adjustably mounted on the outer end of the lever 118. Pivotally attached to the inner end of the lever 118 by the pivot 118' is a counterweight 125 having a shoulder 126 for engaging beneath the lever arm 118. A link 127 operating the electric switch is pivoted to the counterweight 125.

The electric switch is located within the switch box 122 and consists of the contact plate 128 (see Figs. 10, 13 and 14) which is adapted to close the circuit between the two contact points 129 and 130. The contact plate is secured to the spring plates 131 which are riveted at their free ends to arms 132 secured to or integral with the plate 133 which is pivoted by a knife edge to the posts 134 and 134'. The plate 133 has a rearwardly projecting arm 135 that engages the contact plate as the circuit is being closed. The plate 133 has an aperture 137 through which projects the pivoted C-shaped lever 136. The C-shaped lever 136 is pivoted to a post 140 and has a hook-shaped upper end 141 to limit the upward movement of the plate 133, and a toe portion 142 for a purpose that will presently appear. A spring 143 normally holds the lever rearwardly so that the notch 138 will engage the edge of the aperture 137 to hold the plate in lowered position. A lever 139 is pivoted by a knife edge to the posts 134 and 134' at 203 and has elongated loops 204 which engage the pin 205 to prevent the lever from becoming accidentally displaced. Springs 144 connect laterally extending projections at each side of the plates 133 and 139, respectively. A rearwardly extending projection 144' on the plate 139 is adapted to engage the toe portion 142 when the rod 127 has moved upwardly sufficient to cause the springs 144 to pass dead center, and thereby release the plate 133 which being under the tension of the springs snaps the plate away from the contact points. The rod on being lowered causes the springs to pass dead center and thereby snap the plate against the contact points.

Means are provided for automatically opening and closing the valve for controlling the flow of water through the condenser coil 65. This means is regulated by the pressure in the dome 62 and is so arranged that if the pressure becomes excessive the electric switch will be opened and the motor stopped.

One form of device for accomplishing these objects is shown in Figs. 1, 10, 12 and 15. A pipe 145 (see Fig. 1) has one end secured in the dome 62 and has its other end secured in a bellows 146 seated on the base 116. An arm 147 is secured to the upper end of the bellows 146 and has one end pivoted to a link 148 which in turn is pivoted to the base 116. The arm 147 operates a needle valve 149 (see Fig. 15) which controls the supply of water to the condensing coil 65. This needle valve is mounted in the laterally extending internally bored member 150 of a pipe coupling 151. The member 150 is screw-threaded on its outer end and has packing 152' seated on the concaved bottom of the bore. A gland having the bore 152 securing the packing in place is adjustably held in position by means of the nut 153. A pin 154 operating between the bottom of the bore 152 and the cap 153 limits the movement of this needle valve. A light spring 155 about the arm 150 operates against a cap 156 to retract the needle valve. A nut 157 with a conical outer end secures the cap and spring in position. The conical outer end of the nut 157 is adapted to extend through an opening in the plate 158 and engage a plate 159 against the tension of the spring 160 located within a bore in one end of the arm 147. The needle valve 149 has a conical end that engages a restricted passage 161 which connects the recesses 162 and 163. The recess 162 is connected with the pipe 164 which is in turn connected to any convenient source of supply of water. The recess 163 is in communication with the pipe 68.

By interposing the spring 160 between the lever 147 and the needle valve the needle will not be positively jammed against its seat by the lever with the consequent injury to the valve. Furthermore, by this arrangement, a needle of relatively soft material may be employed. It is understood, however, that the spring arrangement may be dispensed with if desirable.

A projection 166 on the arm 147 has a bearing which is engaged by a knife edge carried by the lever 165. The upper side of this lever has a knife edge 168' out of vertical alinement with the knife edge on the lower side of the lever that engages a fulcrum 168 depending from the top frame 120. The outer end of this lever has an adjustable weight 169 mounted thereon and has its inner end pivotally connected to a lever 170 which in turn is suspended from the top frame 120 by the link 171 and has its free end bent laterally as at 172 to engage beneath the weight 125.

When the motor is not running or when the pressure is below normal in the dome the bellows 146 will be in its contracted position and the spring 160 being stronger than the spring 155 will cause the needle valve 149 to close the restricted passage 161 and thereby prevent circulating of the condensing fluid through the condenser coil. When the pressure increases in the dome as when the motor starts the pump to running, the pressure in the dome is communicated through the passage 145 to the bellows which becoming elongated opens the needle valve and permits the circulation of water through the condenser coil. Should the pressure increase, the valve is opened wider and more water flows through the condenser. The reverse operation takes place as the pressure decreases. Should the pressure continue to increase as when the water supply is cut off or when something stops up the valve so that no water flows through or for any cause the pressure in the dome becomes excessive, the further elongation of the bellows will, through the action of the connected levers 165 and 170, cause the laterally extending end 172 of the lever 170 to elevate the weight 125 and with it the link 127 and thus open the electric switch and stop the motor.

In Fig. 1 is shown a charging valve 173. It consists of a body portion having a passage 174 therethrough to each end of which is connected a pipe. A laterally extending member 175 has a screw-threaded passage therethrough which terminates in a recess 176. An auxiliary passage or restricted opening 177 connects the recess 176 with the passage 174. A needle valve 178 having its outer end squared is screwed in the passage 174' and seats in the restricted opening 177. A packing 179 and gland nut 180 insures against leakage about the needle valve. A screw-threaded plug 181 engages the outer end of the boss to close the passage 174'. An aperture 182 closed by a screw-threaded plug 183 communicates with the recess 176. In charging, the plug 183 is removed and the charging apparatus is attached, the needle valve is then unseated by unscrewing it a few turns. After charging the operation is reversed.

In Figs. 18 and 19 is shown a water strainer which is secured on the pressure side of the water supply valve 149. It consists of a casing 185 made in two sections 186 and 187 secured together by means of bolts 188. A gasket 189 seals the joint between the two sections. The two sections together form a recess 190. A screw-threaded opening 195 closed by means of a plug 191 affords means for flushing out or cleaning the screen.

A concavo-convex screen support 192 provided with openings over which is soldered screen wire 193, is adapted to be secured within the recess. The outer or peripheral edge of the screen is flattened out and is adapted to be secured in a recess 194 in the meeting face of member 185. The convex side of the screen faces toward the direction of the water pressure. The water passing through the wire mesh in the screen has the dirt, gravel, etc., screened out of it before it enters the system.

In order to install one of the devices in a building it is only necessary to make the proper electrical connections and to make connections with the water supply and the sewer.

While I have described what I deem to be a preferred form of my invention it will be obvious that various changes and modifications may be made without departing from the spirit and scope thereof as indicated in the appended claims.

I claim:

1. In a mechanical refrigerating apparatus of the class in which the refrigerant and a liquid lubricant of lower specific gravity than the liquefied refrigerant mingle in a closed refrigerant system, the combination of a refrigerant compressor, a condenser connected to the discharge port of the compressor, a vaporizer of the flooded type, a conduit for mingled refrigerant and lubricant leading from the condenser to the vaporizer, return conduit means for vapor and lubricant leading from the vaporizer to the suction side of the compressor, and means for controlling the passage through the first named conduit comprising a valve and an actuating float therefor subject to the buoyancy of the mingled liquid refrigerant and lubricant, the float-actuating valve acting in conjunction with the compressor to maintain the level of the liquid refrigerant in the vaporizer below the top of the vaporizer and provide a vapor space in the upper part thereof, and the return conduit means having in the vaporizer an inlet for lubricant disposed below the top of said vapor space.

2. A refrigerating apparatus as claimed in claim 1 wherein the actuating float is disposed within the vaporizer.

3. In a mechanical refrigerating apparatus of the class in which the refrigerant and a liquid lubricant of lower specific gravity than the liquefied refrigerant mingle in a closed refrigerant system, the combination of a refrigerant compressor, a condenser connected to the discharge port of the compressor, a vaporizer of the flooded type, a conduit for mingled refrigerant and lubricant leading from the condenser to the vaporizer, return conduit means for vapor and lubricant leading from the vaporizer to the suction side of the compressor, and means for controlling the passage through the first named conduit comprising a valve and an actuating float therefor subject to the buoyancy of the mingled liquid refrigerant and lubricant, the float-actuating valve acting in conjunction with the compressor to maintain the level of the liquid refrigerant in the vaporizer below the top of the vaporizer and provide a vapor space in the upper part thereof, and the return conduit means having in the vaporizer an inlet for lubricant disposed below the top of said vapor space and an inlet for vapor always open to said vapor space.

4. A refrigerating apparatus as claimed in claim 3 wherein the actuating float is disposed within the vaporizer.

5. In a mechanical refrigerating apparatus of the class in which the refrigerant and a liquid lubricant of lower specific gravity than the liquefied refrigerant mingle in a closed refrigerant system, the combination of a refrigerant compressor, a condenser connected to the discharge port of the compressor, a vaporizer of the flooded type, a conduit for mingled refrigerant and lubricant leading from the condenser to the vaporizer, return conduit means for vapor and lubricant leading from the vaporizer to the suction side of the compressor, and means for controlling the passage through the first named conduit comprising a valve and an actuating float therefor subject to the buoyancy of the mingled liquid refrigerant and lubricant, the float-actuating valve acting in conjunction with the compressor to maintain the level of the liquid refrigerant in the vaporizer below the top of the vaporizer and provide a vapor space in the upper part thereof, and the return conduit means having in the vaporizer an inlet for lubricant disposed below the top of said vapor space and an inlet for vapor disposed above the level of said inlet for lubricant.

6. A refrigerating apparatus as claimed in claim 5 wherein the actuating float is disposed within the vaporizer.

7. In refrigerating apparatus, the combination of means for liquefying a gaseous refrigerant, a vaporizer of the flooded type comprising an expansion chamber, a conduit to conduct liquid refrigerant from the liquefying means to the expansion chamber, a return conduit to conduct vaporized refrigerant from the expansion chamber back to the liquefying means, an inwardly opening float-actuated valve in the expansion chamber to control admission of liquid refrigerant thereto and adapted in conjunction with the said liquefying means to maintain a suitable volume of the liquid refrigerant therein, said valve having a spring interposed between the valve proper and its actuating float, whereby said valve is adapted to act as a check valve if the pressure on the inlet side thereof falls below the pressure in the expansion chamber.

8. In a device of the class described, an expansion chamber having an inlet and an outlet port for the passage of the refrigerant and oil, and a pipe secured in said outlet port and extending inward and upward for the passage of the vaporous refrigerant and having holes in the side thereof for providing a passage for the oil, substantially as shown and described.

9. In a refrigerating system of the compressor-condenser-evaporator type through which oil and refrigerant of different specific gravities travel in cycle, the method of controlling the relation of the oil and refrigerant in their travel through the low pressure side of the system, comprising admitting oil and refrigerant into a single accumulation in the evaporator as required to maintain a substantially constant quantity therein, then causing vaporization of a portion of said accumulation, and then returning to the compressor the gasified refrigerant together with sufficient liquid taken directly from the remaining accumulation to maintain constant amounts of refrigerant and oil in said accumulation.

10. In a refrigerating system of the compressor-condenser-evaporator type through which oil and refrigerant of different specific gravities travel in cycle, the method of controlling the relation of the oil and refrigerant in their travel through the low pressure side of the system comprising automatically admitting oil and refrigerant into a single accumulation in the evaporator as required to maintain a substantially constant quantity therein, then causing separation of refrigerant from the accumulation by vaporization, and then returning to the compressor the vaporized refrigerant and liquid taken directly from the remaining accumulation by gravity.

11. In a refrigerating system of the compressor-condenser-evaporator type through which oil and refrigerant of different specific gravities travel in cycle, the method of controlling the relation of the oil and refrigerant in their travel through the low pressure side of the system comprising automatically admitting oil and refrigerant into a single accumulation in the evaporator as required to maintain a substantially constant quantity therein, then causing separation of refrigerant from the accumulation by vaporization and separation of a portion of the remaining liquid from the accumulation by gravitation, and then returning the separated vaporized refrigerant and liquid to the compressor.

12. In a refrigerating system of the compressor-condenser-evaporator type through which a body of refrigerant and oil, of higher specific gravity than said refrigerant, travels in cycle, the method of controlling the relation of the refrigerant and oil within the evaporator which comprises admitting to the evaporator sufficient oil and refrigerant to maintain substantially constant the level of the junction of the two liquids and draining from the evaporator sufficient oil to maintain substantially constant the level thereof.

13. In a mechanical refrigerating system, a stationarily mounted evaporator having inlet means for admitting liquid refrigerant and oil and an outlet, a fluid disposed within said evaporator comprising liquid refrigerant and oil of relatively different specific gravities adapted to separate by gravitation, and automatic control means for maintaining a substantially constant quantity of refrigerant within the evaporator.

14. In a mechanical refrigerating system, a fluid circulating within said system comprising liquid refrigerant and oil of relatively different specific gravities adapted to separate by gravitation, an evaporator having inlet means for admitting liquid refrigerant and oil and an outlet and adapted to retain an accumulation of refrigerant and oil, and automatic control means for maintaining substantially constant the level of the junction of the two liquids within the evaporator.

15. In a mechanical refrigerating system, a fluid circulating within said system comprising liquid refrigerant and oil of relatively different specific gravities and adapted to separate by gravitation, an evaporator having an inlet and adapted to retain an accumulation of refrigerant and oil, and automatic control means for admitting the refrigerant and oil to the evaporator to maintain substantially constant the level of the junction of the two liquids within the evaporator, and additional means to maintain constant the level of the liquid of lower specific gravity in the evaporator.

16. In a mechanical refrigerating system, a stationarily mounted evaporator having inlet means for admitting liquid refrigerant and oil and an outlet, a fluid disposed within said evaporator comprising liquid refrigerant and oil of relatively different specific gravities adapted to separate by gravitation, and automatic control means disposed within the evaporator for maintaining a substantially constant quantity of refrigerant within the evaporator.

17. In a mechanical refrigerating system, a fluid circulating within said system comprising liquid refrigerant and oil of relatively different specific gravities adapted to separate by gravitation, an evaporator having inlet means for admitting liquid refrigerant and oil and outlet and adapted to retain an accumulation of refrigerant and oil, and automatic control means disposed within said evaporator for maintaining substantially constant the level of the junction of the two liquids within the evaporator.

18. In a mechanical refrigerating system, a fluid circulating within said system comprising liquid refrigerant and oil of relatively different specific gravities and adapted to separate by gravitation, an evaporator having an inlet means and adapted to retain an accumulation of refrigerant and oil, and automatic control means disposed within said evaporator for admitting the refrigerant and oil to the evaporator to maintain substantially constant the level of the junction of the two liquids within the evaporator, and additional means to maintain substantially constant the level of the liquid of lower specific gravity in the evaporator.

19. In a mechanical refrigerating system of the flooded type, a vaporizer provided with an inlet and an outlet, a valve for said inlet, a fluid disposed within the evaporator comprising refrigerant and oil, the refrigerant being of relatively low specific gravity and the oil being of relatively higher specific gravity and adapted to separate from the heavier liquid by gravitation, a float operatively connected to said valve and disposed within the fluid in said evaporator, said float being so calibrated as to remain at the junction of the two liquids.

20. In a mechanical refrigerating system of the flooded type, a rigidly mounted evaporator, a fluid disposed within the evaporator comprising a lower layer of relatively heavy liquid refrigerant and an upper layer of relatively light oil, an inlet to said evaporator and means associated therewith adapted to control the amount of liquid refrigerant in the evaporator, and an outlet to said evaporator adapted to control the amount of oil in said evaporator.

21. In a mechanical refrigerating system, an evaporator having an inlet and an outlet, a body of liquid refrigerant and oil disposed within said evaporator, means for admitting additional liquid refrigerant and oil to said evaporator through said inlet, a conduit connected to said outlet and extending upwardly within said evaporator, said conduit being provided adjacent its upper end with a port adapted to drain excess oil from said evaporator.

22. In a mechanical refrigerating system, an evaporator having an inlet and an outlet, a body of liquid refrigerant and oil disposed within said evaporator, means for maintaining the level of the liquid above the lowermost point of the outlet port, and a pipe disposed within said evaporator and connected to said outlet port, said pipe having a portion extending upwardly through said liquid and provided with an aperture and adapted to drain refrigerant in gaseous form and oil in liquid form from the evaporator.

23. In a mechanical refrigerating system, an evaporator having a refrigerant inlet opening and adapted to contain a body of liquid refrigerant and oil adapted to separate by gravitation, a tube extending into said evaporator and provided with an opening therein for conducting oil and gasified refrigerant therefrom, and means for maintaining the level of the liquid refrigerant in said evaporator below the opening in said tube.

In testimony whereof I affix my signature.

JOHN R. REPLOGLE.